(12) United States Patent
Hauke et al.

(10) Patent No.: US 12,277,772 B2
(45) Date of Patent: Apr. 15, 2025

(54) METHOD AND SYSTEM FOR ASSESSMENT OF CUSTOMER ORDERING IN A DRIVE-THROUGH

(71) Applicant: ADVANCED VIDEO ANALYTICS INTERNATIONAL AG, Langnau a. Albis (CH)

(72) Inventors: Rudolf Hauke, Niederstotzingen (DE); Markus Kächele, Walzenhausen (CH)

(73) Assignee: ADVANCED VIDEO ANALYTICS INTERNATIONAL AG, Langnau a. Albis (CH)

( * ) Notice: Subject to any disclaimer, the term of this patent is extended or adjusted under 35 U.S.C. 154(b) by 0 days.

(21) Appl. No.: 18/028,908

(22) PCT Filed: Sep. 29, 2020

(86) PCT No.: PCT/EP2020/077275
§ 371 (c)(1),
(2) Date: Mar. 28, 2023

(87) PCT Pub. No.: WO2022/069026
PCT Pub. Date: Apr. 7, 2022

(65) Prior Publication Data
US 2023/0343102 A1    Oct. 26, 2023

(51) Int. Cl.
*G06V 20/52* (2022.01)
*G06Q 10/04* (2023.01)
(Continued)

(52) U.S. Cl.
CPC ............. *G06V 20/52* (2022.01); *G06Q 10/04* (2013.01); *G06Q 50/12* (2013.01); *G06V 10/82* (2022.01);
(Continued)

(58) Field of Classification Search
USPC ........................................................ 348/143
See application file for complete search history.

(56) References Cited

U.S. PATENT DOCUMENTS 6,996,460 B1   2/2006 Krahnstoever et al.
9,230,415 B2   1/2016 Gromley et al.
(Continued)

OTHER PUBLICATIONS

International Search Report for PCT/EP2020/077275, Prepared by the European Patent Office, mailing date Jun. 4, 2021, 2 pages.

*Primary Examiner* — Amir Shahnami
(74) *Attorney, Agent, or Firm* — Grüneberg and Myers PLLC

(57) ABSTRACT

Video surveillance system for assessment of customer ordering in a drive-through, wherein the video surveillance system having a first camera, a second camera, a network, a control unit, a computer vision unit. The first camera acquires a first image, the second camera acquires a second image. The computer vision unit has a calculating features for the first and second images. The computer vision unit a means for matching such features, wherein a vehicle is tracked by matching the first image and second images. The control unit computes a time span between the appearance of the vehicle appearing in the first image and appearing in the second image. The first and second cameras are arranged laterally to a side window of the vehicle, so that inside the vehicle is recorded at two time points.

13 Claims, 5 Drawing Sheets

(51) Int. Cl.
*G06Q 50/12* (2012.01)
*G06V 10/82* (2022.01)
*G06V 40/10* (2022.01)
*G06V 40/20* (2022.01)

(52) U.S. Cl.
CPC .............. *G06V 40/10* (2022.01); *G06V 40/20* (2022.01); *G06V 2201/05* (2022.01)

(56) References Cited

U.S. PATENT DOCUMENTS

| | | | |
|---|---|---|---|
| 2004/0260513 A1* | 12/2004 | Fitzpatrick | G06Q 50/12 702/182 |
| 2015/0206081 A1 | 7/2015 | Lee et al. | |
| 2017/0099200 A1* | 4/2017 | Ellenbogen | G06V 10/764 |
| 2019/0385173 A1 | 12/2019 | Johnsen et al. | |
| 2020/0065881 A1* | 2/2020 | Truong | G06V 20/62 |
| 2020/0193998 A1* | 6/2020 | Abou Antoun | G06V 10/764 |

* cited by examiner

METHOD AND SYSTEM FOR ASSESSMENT OF CUSTOMER ORDERING IN A DRIVE-THROUGH

CROSS-REFERENCE TO RELATED APPLICATION

This application is the U.S. national phase of PCT Application No. PCT/EP2020/077275 filed on Sep. 29, 2020, the disclosure of which is incorporated in its entirety by reference herein.

The invention relates to a method and a system for assessment of customer ordering in a drive-through by the use of computer vision according to the class of the independent claims.

BACKGROUND ART

US20040260513A1 discloses a real-time prediction and management system that calculates optimal food buffer levels demand. The systems employ a computer vision system that uses image processing techniques that detect and track vehicles in several camera views. Customers are counted by the system and a queuing model estimates arrival of the customers in order to predict future food demand.

U.S. Pat. No. 6,996,460B1 discloses a method and apparatus for providing an enhanced automatic drive-thru experience to customers in a vehicle by allowing use of natural hand gesture to interact with digital content. To this end, a computer vision system is employed and statistics such as interaction time, traffic measurements are gathered.

U.S. Pat. No. 9,230,415B2 discloses a banking system that uses metrics in acquiring and processing event data of financial transaction activity. To this end, an automatic banking machine includes sensors, such as cameras, to detect event data.

SUMMARY OF THE INVENTION

In contrast, an inventive video surveillance system for assessment of customer ordering in a drive-through with the features of independent claim 1 has an advantage due to the described arrangement of a first camera and of a second camera. As the first camera is arranged laterally and the second camera is arranged laterally both oriented to a side window of a vehicle moving through the drive through, a customer, e.g. a driver, inside the car can be easily detected and meaningful features through the side window with the customer computed by a computer vision method. In this manner, the matching and assignment of a customer's vehicle between the two cameras is less error-prone and an assessment of the ordering time is achieved.

Further, an inventive method according to independent claim 3 has the advantage that a concise time measuring between a movement of the vehicle between a field of view of the first camera and a field of view of the second camera is achieved. This is achieved by saving a first time stamp when the vehicle with the customers is detected in the first video sequence of the first camera and saving a second time stamp when the vehicle with the customers is detected in the second video sequence of the second camera respectively and a successful matching of the first features of the area framed by the side window of the vehicle in its first appearance and the second features of the area framed by the side window of the vehicle in its second appearance.

Furthermore, an inventive method according to independent claim 6 is of advantage because if the activity is analyzed and it is determined that the activity is an intended interaction of the person in order to fulfil a part in the ordering process, a detailed information about a partitioning of the whole ordering process of the customer can be derived. For example, it can be derived why a person does not proceed with her ordering process.

Advantageous refinements and improvements of the inventive method and the inventive video surveillance system according to the independent claims are possible by provisions recited in the dependent claims.

A dashboard visualization is advantageous as the computed time spans of a customer's vehicle in the ordering process or derived statics can be efficiently displayed and a comparison with former determined data of other vehicles can be presented.

It is advantageous, to employ a neural network for detection of the side window and/or the customer and/or the feature calculation and/or matching of the first and the second features as contemporary neural networks architectures achieve high performance for these tasks.

It is advantageous, to evaluate the first time stamp for the matching as subsequent steps of the customer ordering process should be logically consistent and can be analyzed using the first time stamp.

It is advantageous, too, to evaluate the first time stamp and/or the second time for predicting a forecast of upcoming orders so that required resources for serving customers can be provided in time.

Another advantage is processing and evaluating an audio signal for determining the activity of the person in order to support the computer vision methods.

Further is advantageous, if the beginning time and/or the ending time of the intended interaction are precisely determined for accurate statistics.

Another advantage is the determination of the level of satisfaction of the person doing the ordering process. Thus, the ordering process with regard to better customer experience can be improved with the derived information of the level of satisfaction.

Further, analyzing different gestures as the person's movements of her arm, hand, face, lips, eyebrow and/or eye can achieve a precise determination of the level of satisfaction of the person.

The display of the satisfaction by a dashboard offers the advantage to monitor the satisfaction levels over time and to react and improve the ordering process appropriately.

Further, analysis of the person's movements can be used to signal automatically unusual behavior, such a as vehicle failure, which require response of service personnel.

Furthermore, a detection of a weapon in the vehicle by computer vision methods is of advantage, as service personnel can be warned of a possible dangerous situation.

BRIEF DESCRIPTION OF THE DRAWINGS

Embodiments of the invention are illustrated in the drawings and explained in detail in the following description.

FIG. 1 is an illustration of an exemplary setup of an embodiment of the invention. In the embodiment a video surveillance system 1 is shown as in a typical drive-through. The video surveillance system 1 comprises a first camera 5, second camera 6, a network 4, a control unit 2, and a computer vision unit 3. The first camera 5 and the second camera 6 are connected by the network 4 with the control unit 2 which comprises the computer vision unit 3. For example, the first camera 5 is installed in a customer order display 10 and the second camera 6 at a payment window 11. Other examples of locations of the first camera 5 or second camera 6 are an electronic payment terminal, a pickup window or pickup station or a parking position.

Figure 1:
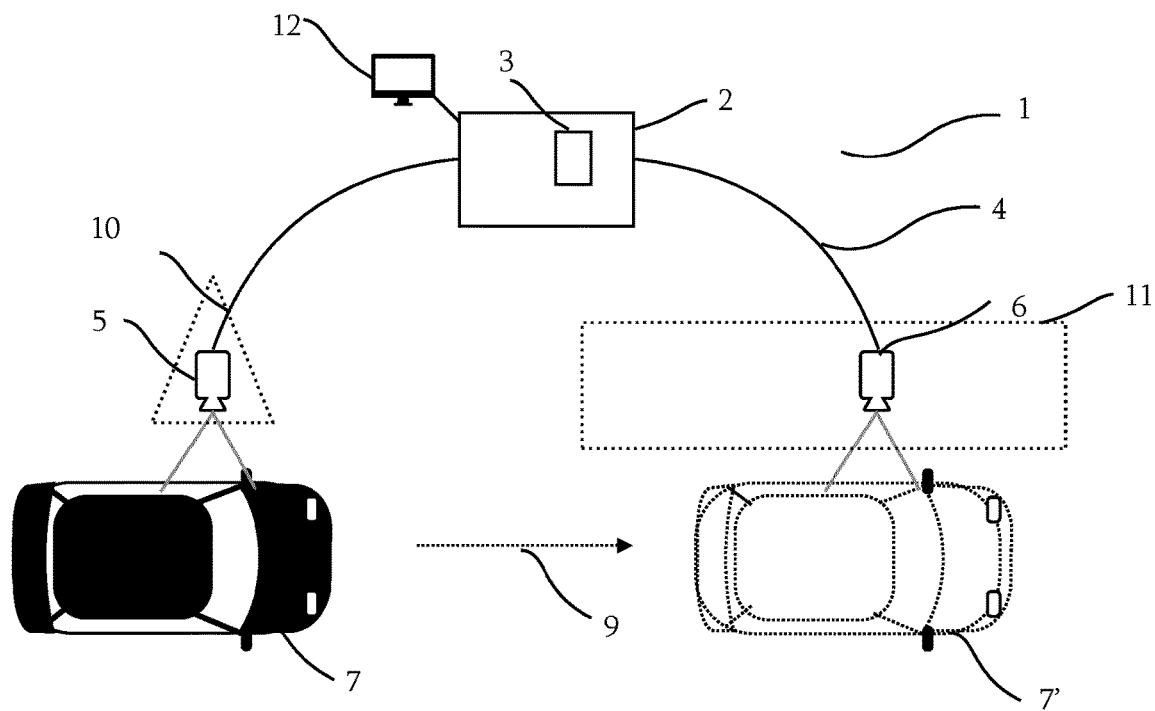
FIG. 1 shows an exemplary system of the invention from a top view.

The video surveillance system 1 acquires a first image by the first camera 5 of a vehicle 7 at a first point in time. The first image is transferred by the network 4 to the control unit 2 and the computer vision unit 3. The computer vision unit 3 comprises computer vision means such as methods for computing image features, object detection, object tracking, and feature matching. For example, image features can be color histograms, and/or salient object features such as scale-invariant features, rotation-invariant, and/or translation-invariant features. For example, such methods are based on neural networks as convolutional neural networks or recurrent neural networks which were previously trained using an image database. The computer vision unit 3 detects the appearance of the vehicle 7 in the first image and computes a first feature vector. The control unit 2 saves a first time stamp of the detection of the vehicle 7 in the first image.

The vehicle 7 moves further in a direction 9. At a second point in time, the vehicle 7' reaches a new location where the second camera 6 acquires a second image of the vehicle 7'. The second image is transferred by the network 4 to the control unit 2 and the computer vision unit 3. The computer vision unit 3 detects the appearance of the vehicle 7' and computes a second feature vector. The control unit 2 saves a second time stamp of the detection of the vehicle in the first image. The first feature vector and the second feature vector are matched by the computer vision unit 3. The computer vision unit 3 uses a result of the matching for tracking the vehicle 7, 7' between the first camera 5 and the second camera 6.

In other instances, the tracking can be used between multiple cameras. In a multi-camera setting, relative locations of the multiple cameras to each other and time stamps can be evaluated for matching vehicles. For example, if the vehicle 7 leaves the location, such as a customer ordering display, of the first camera 5 at the first time stamp and a further vehicle leaves a location, such as a further customer ordering display, of a further camera at a further time stamp, a prediction is calculated which vehicle will arrive first at a location, such as a pay window, following in an ordering process. For example, if distances between the customer ordering display and the pay window and the further customer ordering display and the pay window are equal, a comparison of the first time stamp and the further time stamp is done and an appearance which vehicle will be next at the pay window is predicted by a first-in first-out assumption.

The first camera 5 is arranged laterally and oriented to a side window of the vehicle 7. The second camera 6 is arranged laterally and oriented to the side window of the vehicle 7'. Due to the orientation of the first camera 5, a customer inside the vehicle 7 is recorded in the first image at the first time point. Due to the orientation of the second camera 6, the customer inside the vehicle 7' is recorded in the second image at the second time point. Thus, the first features and the second features are computed for images containing a view inside the vehicle's 7, 7' cabin with the customer in it throughout the side window.

The control unit 2 evaluates the result of the matching and computes the time span between the first appearance of the vehicle 7 and the second appearance of the vehicle 7' using the first time span and the second time span.

In a further embodiment of the invention, the video surveillance system 1 comprises a display 12 presenting a dashboard visualization 60 of the computed time span or derived statistics of the time span.

In a further embodiment of the invention, the first camera and/or the second camera comprises a mean for audio signal recording, such as a microphone.

Figure 2:
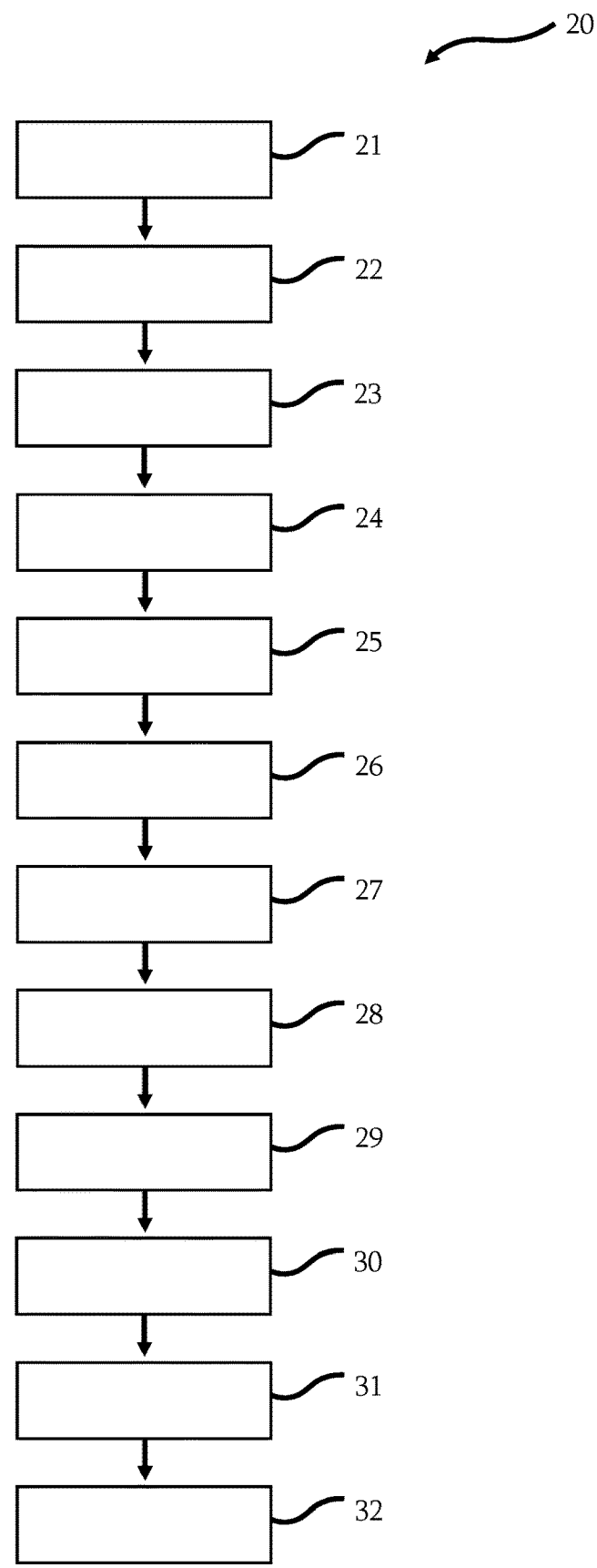
FIG. 2 shows a flowchart illustrating a method of the invention.

FIG. 2 is a flow diagram of the method 20 of the invention for assessment of customer ordering in a drive through comprising twelve processing steps 21, 22, 23, 24, 25, 26, 27, 28, 29, 30, 31, 32 as used by the video surveillance system 1.

In a first processing step 21, the first camera 5 continuously acquires a first video sequence. In a second processing step 22, the first appearance of the vehicle 7 with a customer in the first video sequence is determined. In a third processing step 23, an area of a side window of the vehicle 7 is detected and the customer inside the area is detected. In a fourth processing step 24, first image features of the area are computed. In a fifth processing step 25, the first time stamp is saved. In a sixth processing step 26, the second camera 6 continuously acquires a second video sequence. In a seventh processing step 27, the second appearance of the vehicle 7' with the customer in the second video sequence is determined. In an eighth processing step 28, an area of the side window of the vehicle 7' is detected and the customer inside the area is detected. In a ninth processing step 29, second image features of the area are computed. In a tenth processing step 30, the second time stamp is saved. In an eleventh processing step 31, the first image features and the second image features are matched. In a twelfth processing step 32, a result of the matching is evaluated and if the matching is evaluated as successful, the time difference between the second time stamp and the first time stamp is computed.

In an embodiment of the inventive method 20, a neural network is used for the detection 23 of the side window of the vehicle 7, 7' and/or for the detection of the customer and/or for the calculation 24 of the first features and/or for the calculation 29 of the second features and/or for the matching 32.

For example, the computed time difference is the order taking time or the cashing time or the handing over time.

In an embodiment of the inventive method 20, a prediction is derived by evaluating the first time step and/or the second time stamp. For example, the first time stamp and/or the second time stamp can be stored with additional parameters, such as weekday or weather, and used by a machine learning method or time series analysis method which are trained to predict customer arrivals dependent on the parameters such as weekday or weather.

Figure 3:
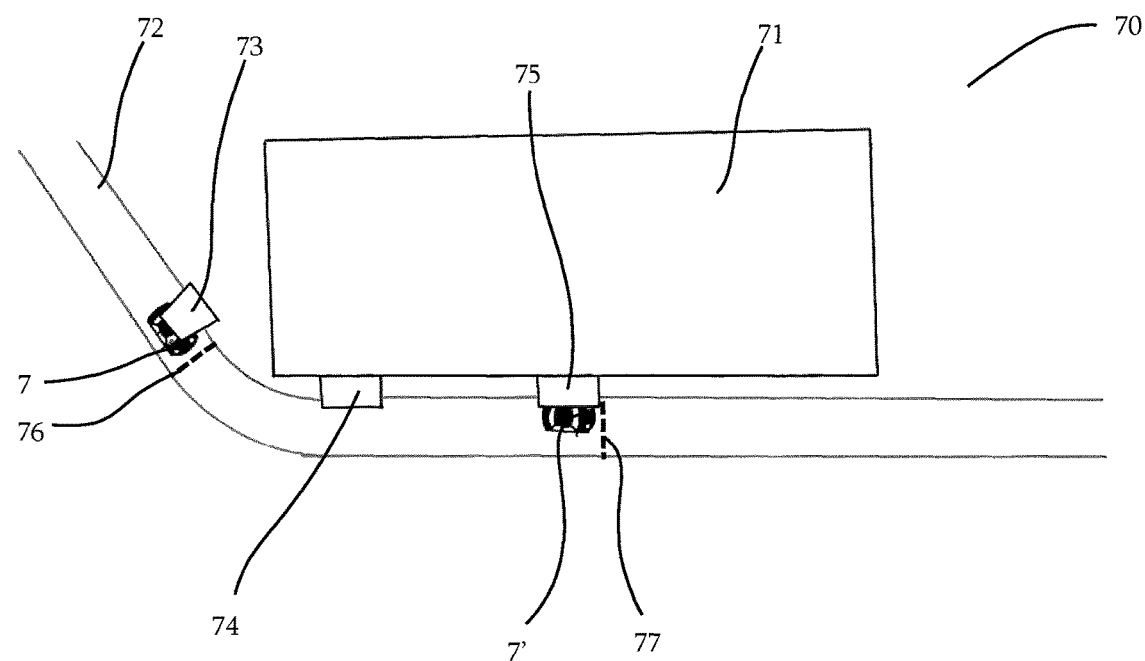
FIG. 3 illustrates an exemplary camera setup of an installation of the invention at a drive-through restaurant from a top view.

FIG. 3. illustrates an exemplary installation 70 of the invention at a drive-through restaurant 71 with a driveway 72 from a top view. Cameras are installed at three locations: at a customer order display 73, at a payment terminal 74, and at a pick-up window 75. The vehicle 7, 7' with the customer is shown at two points in time while moving the drive-way. Time spans can be determined by the inventive method 20 for each location and yield, for example, the order taking time, the payment time, and the pick-up time. Different combinations of these time spans allow further computations, for example the duration of the total experience of the order or the duration between the end of the order and the begin of the payment. For example, a duration can be determined between passing a first line 76 by the vehicle 7 and passing a second line 77 by the vehicle 7'.

Figure 4:
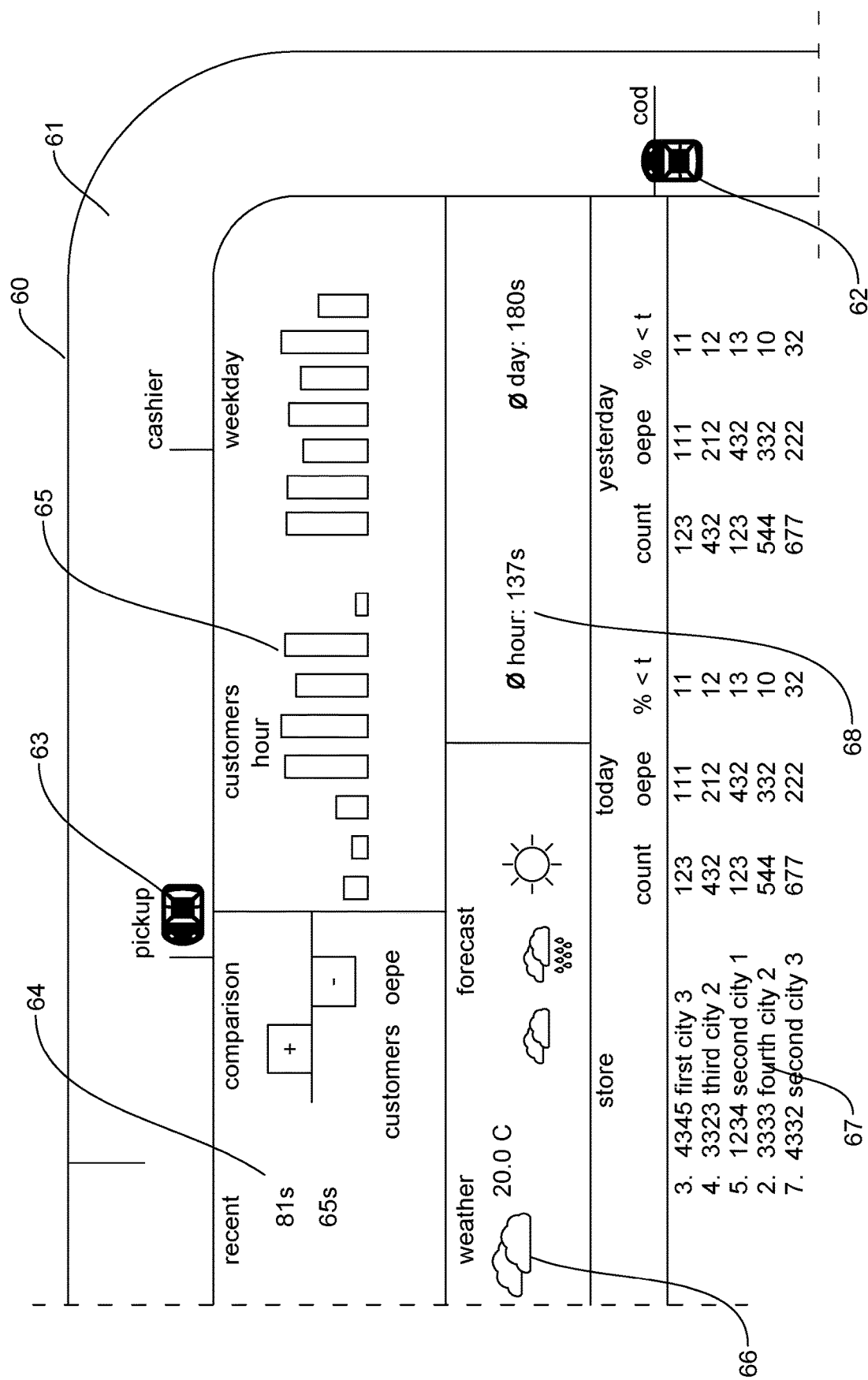
FIG. 4 is a sketch of a computer displayed dashboard showing the monitoring and prediction of customer experience of analyzed data gather by the present invention.

FIG. 4 shows an exemplary dashboard visualization 60 presenting data gathered by the methods of the invention. In this exemplary dashboard visualization 60, a street 61, a first car 62, a second car 63, a first statistics plot 64, a second statistics plot 65, a weather forecast 66, a table 67 with data values and a third statistics plot 68 are displayed. The visualization of the street 61 shows the track of cars moving to a drive-through. The first car 62 is displayed as waiting at a position of a customer order display. The second car 63 is displayed as waiting at a position of a pickup station. The first statistics plot 64 shows how long ordering processes take and durations between ordering and pickup of recent orders as well as comparisons are displayed. The second statistics plots 65 presents the number of customers per hour and weekday as bars. The weather forecast 66 shows a weather forecast with icons and numbers. The table 67 shows data of different store locations arranged in order to compare measurements. The third statistics plot 68 shows averages of measurements derived from the data gathered by the methods of the invention.

Figure 5:
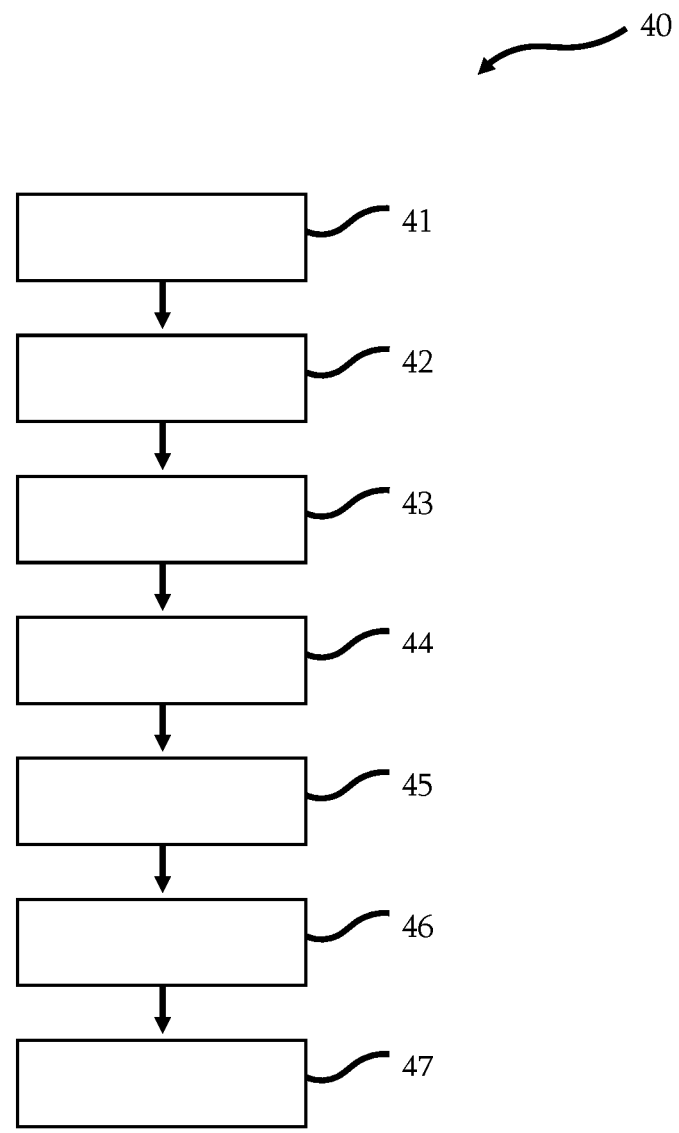
FIG. 5 shows a further flowchart illustration of a method of the invention.

FIG. 5 shows a further embodiment of a method 40 according to the invention. The method 40 for activity recognition of a person in a vehicle 7, 7' during an ordering process comprises seven processing steps. The person is a customer in the ordering process. In a first processing step 41, a video sequence of the vehicle 7, 7' is acquired. In a second processing step 42, the person in the vehicle is detected by computer vision methods. In a third processing step 43, an activity of the person is determined by computer vision methods. In a fourth processing step 44, the activity is further analyzed if the activity is an intended interaction of the person in order to proceed with her order. In a fifth processing step 45, the begin of the indented action and the beginning time point of the intended action and/or the end of the intended action and the ending time point of the intended interaction are determined. In a sixth processing step 46, the activity of the person is further analyzed and a level of the person's satisfaction during the indented interaction is determined. For example, determining the level of the person's satisfaction employs an analysis of the person's movements of an arm, a hand, a head, a face, lips, an eyebrow, and/or an eye. In a seventh processing step 47, the beginning time and/or the ending time, and/or the level the persons's satisfaction, and/or derived metrics of the beginning time and/or of the ending time and/or of the level of the persons's satisfaction are visualized by a dashboard 60 on a computer display 6.

In a further embodiment of the inventive method 40, in the third processing step 43, an audio signal recorded along the video sequence is additionally evaluated. The audio signal is processed using speech recognition and/or sound recognition and results of speech recognition and/or sound recognition are used as further input for the activity recognition.

In a further embodiment of the inventive method 40, the method 40 comprises a further processing step which detects a weapon or a suspicious object near the person by computer vision methods.

The invention claimed is:

1. A video surveillance system for assessment of customer ordering in a drive-through, wherein the video surveillance system comprises a first camera, a second camera, a network, a control unit, a computer vision unit, wherein the first camera acquires a first image, wherein the second camera acquires a second image, wherein the computer vision unit comprises means for calculating features of the first image and the second image, wherein the computer vision unit comprises means for matching such features, wherein a vehicle is tracked by matching the first image and the second image, wherein the control unit computes a time span between the appearance of the vehicle appearing in the first image and appearing in the second image, wherein, the first camera is arranged laterally and oriented to a side window of the vehicle at a first point in time while the vehicle is moving through the drive-through, and the second camera is arranged laterally and oriented to the side window of the vehicle at a second point in time while the vehicle is moving through the drive-through, wherein a customer inside the vehicle is recorded in the first image at the first point in time, wherein the customer inside the vehicle is recorded in the second image at the second point in time.

2. The video surveillance system according to claim 1, wherein, the video surveillance system comprises a display presenting the time span or derived statistics of the time span on a dashboard visualization.

3. A method for assessment of customer ordering in a drive-through, comprising acquiring continuously a first video sequence from a first camera, determining a first appearance of a vehicle with a customer in the first video sequence, detecting an area of a side window of the vehicle and detecting the customer inside the area in the first video sequence, calculating first features of the area, saving a first time stamp, acquiring continuously a second video sequence from a second camera, determining a second appearance of the vehicle with the customer in the second video sequence, detecting the area of the side window of the vehicle and detecting the customer inside the area in the second video sequence, calculating second features of the area, saving a second time stamp, matching the first features and the second features, determining a time difference between the second time stamp and the first time stamp in case of a successful matching.

4. The method according to claim 3, characterized in, for detection of the side window of the vehicle and/or for the detection of the customer and/or for the calculation of the first features and/or for the calculation of the second features and/or for the matching, a neural network is employed.

5. The method according to claim 3, characterized in, for the matching the first time step is evaluated.

6. The method according to claim 3, further comprising, predicting a quantity of upcoming orders by evaluating the first time stamp and/or the second time stamp.

7. A method for activity recognition of a person in a vehicle during an ordering process, comprising acquiring continuously a video sequence of the vehicle, detecting the person in the vehicle in the video sequence, determining an activity of the person by computer vision methods, and determining if the activity is an intended interaction of the person in the ordering process.

8. The method according to claim 7, wherein determining the activity of the person by computer vision methods an audio signal is processed additionally.

9. The method according to claim 7, further comprising, determining a beginning time and/or an ending time of the intended interaction of the person in the ordering process.

10. The method according to claim 7, further comprising, determining a level of the person's satisfaction during the intended interaction of the person.

11. The method according to claim 10, wherein determining the level of the person's satisfaction comprises analyzing the person's movements of an arm, a hand, head, face, lips, eyebrows, and/or eyes.

12. The method according to claim 8, further comprising, visually displaying the beginning time and/or the ending time, and/or the level of the persons's satisfaction, and/or derived metrics of the beginning time and/or of the ending time and/or of the level the persons's satisfaction by a dashboard on a computer display.

13. The method according to claim 8, further comprising, detecting a weapon in the vehicle in the video sequence.

* * * * *